(No Model.) 2 Sheets—Sheet 2.
R. H. TISDALE.
STALK CHOPPER.
No. 440,973. Patented Nov. 18, 1890.
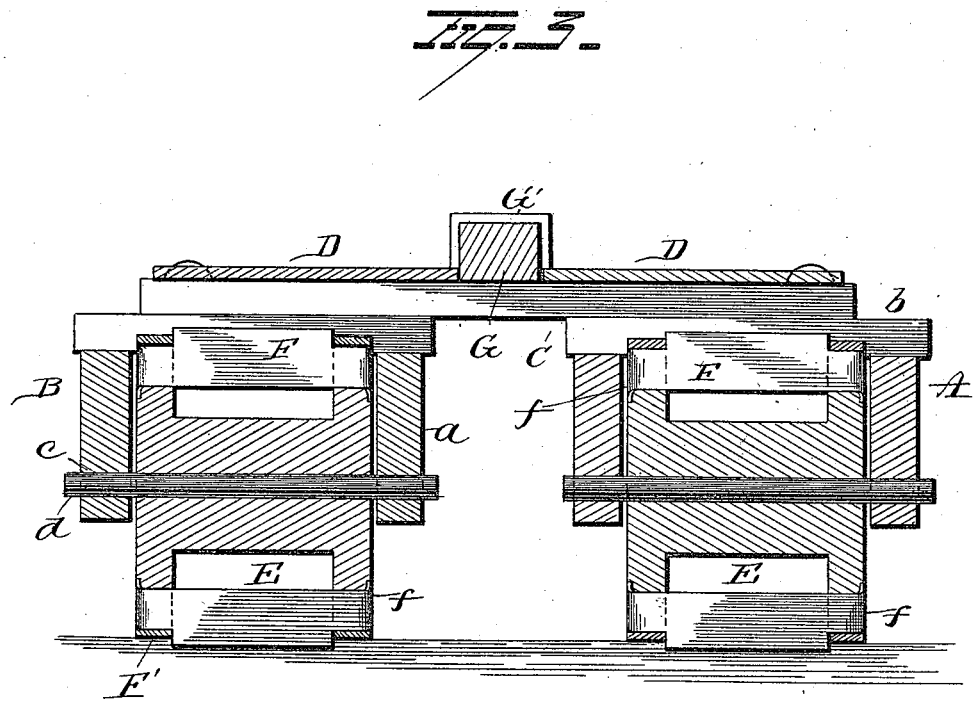
Witnesses
Inventor
R H Tisdale
By his Attorney

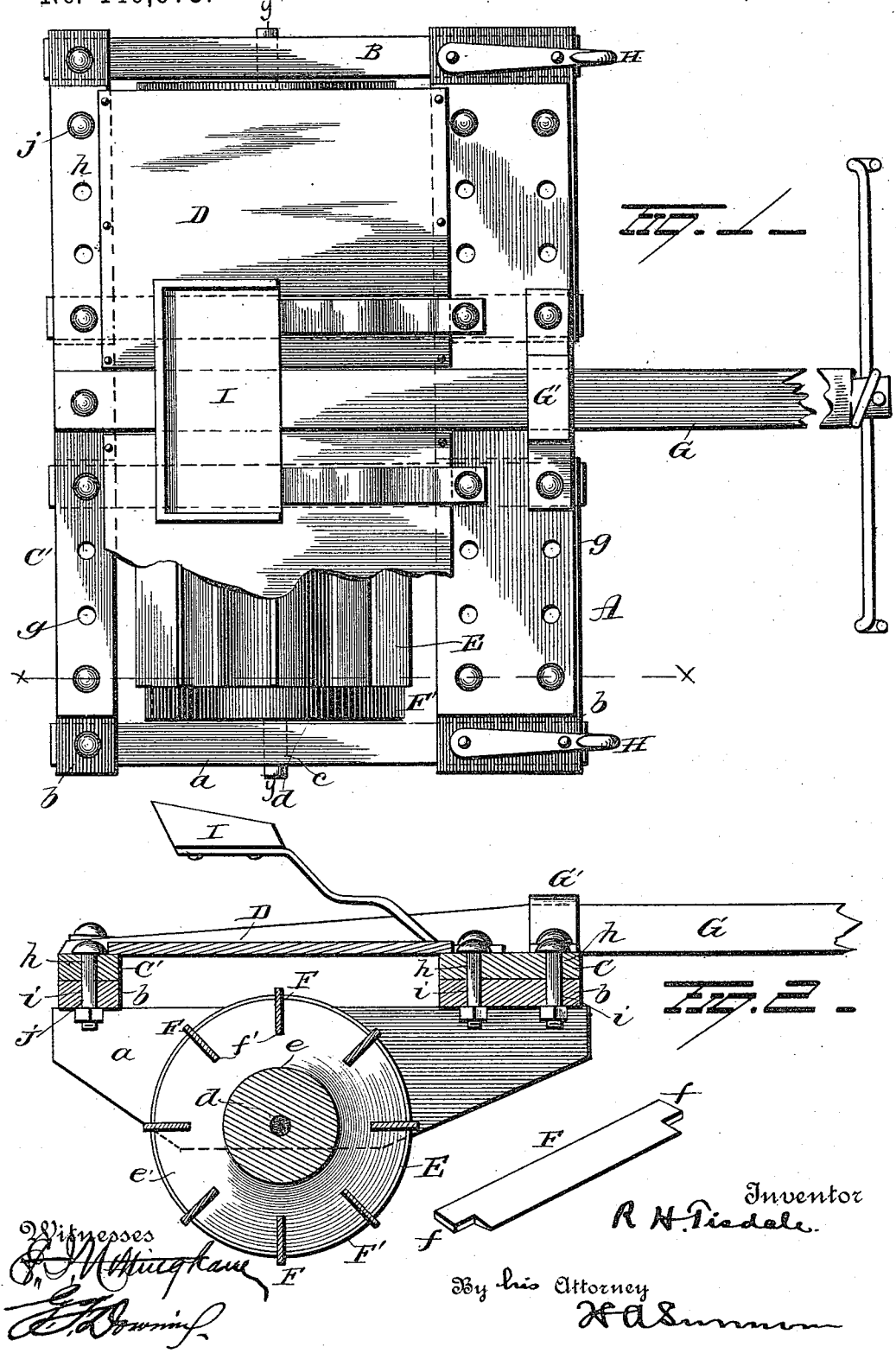

UNITED STATES PATENT OFFICE.

ROBERT H. TISDALE, OF SUMTER, SOUTH CAROLINA.

STALK-CHOPPER.

SPECIFICATION forming part of Letters Patent No. 440,973, dated November 18, 1890.

Application filed March 24, 1890. Serial No. 345,066. (No model.)

*To all whom it may concern:*

Be it known that I, ROBERT H. TISDALE, of Sumter, in the county of Sumter and State of South Carolina, have invented certain new and useful Improvements in Cotton and Cornstalk Choppers; and I do hereby declare the following to be a full, clear, and exact description of the invention, such as will enable others skilled in the art to which it appertains to make and use the same.

My invention relates to an improvement in cotton and cornstalk choppers, and has for its object to produce a device of the class mentioned which shall be of simple and substantial construction, easy to manipulate, and effective in operation.

A further object is to so construct the device that the frames which carry the chopping-wheels shall be adjustable laterally.

With these objects in view the invention consists in certain novel features of construction and combinations and arrangements of parts, as hereinafter set forth, and pointed out in the claims.

In the accompanying drawings, Figure 1 is a plan view, partly in section. Fig. 2 is a sectional view on the line $x$ $x$ of Fig. 1. Fig. 3 is a sectional view on the line $y$ $y$ of Fig. 1.

A indicates a frame comprising two smaller frames B B, connected at their respective ends by means of connecting-bars C C', which latter are connected by covers or tops D. Each frame B is composed of two hangers $a$ $a$, connected at their ends by means of cross-bars $b$, the hangers $a$ being provided with aligned perforations $c$, which produce bearings for the respective ends of the shaft $d$ of a chopping-wheel E. Each wheel E comprises a hub $e$, secured in any suitable manner to the axle $d$, disks $e'$, at the respective ends of the hub, and knives F, connected at their respective ends to the disks $e'$. Each knife F is restricted at its respective ends to produce shanks $f$, which shanks are inserted in suitable sockets $f'$, made in the peripheries of the disks $e'$, and project beyond the outer faces thereof, where they may be secured in any desired manner. The edges of the knives F project beyond the peripheries of the disks, as shown in Fig. 2, and are retained in their sockets by means of a tire F', passing around and secured to said peripheries. The front and rear connecting-bars C C' are each provided with two or more sets of perforations $g$ $h$, which perforations are adapted to align with similar perforations $i$ in the cross-bars $b$ of the frames B. Through one or more of each set of these aligned perforations fastening devices $j$ are inserted to connect the two frames B with the connecting-bars C C'. By this construction the frames B and chopping-wheels E carried thereby may be adjusted at any desired distance apart, whereby the apparatus may be readily adjusted and be adapted for use where the rows of cotton are at varying distances apart. A tongue G is attached at its rear end to the center of the rear connecting-bar C' and passes loosely through a bracket G', secured to the front connecting-bar C. At or near the outer extremities of the front connecting-bars $b$ are hooks H, to which whiffletrees may be attached.

A driver's seat I is mounted upon spring-arms I', which latter are secured at their forward ends to the front cross-bar C and extend rearwardly over the axis of the wheels E. The tops or covers D will protect the driver from contact with the wheels E or from any dirt from the same.

The machine constructed as above set forth is exceedingly simple and easy to manufacture and effective in operation.

Having fully described my invention, what I claim as new, and desire to secure by Letters Patent, is—

1. In a stalk-chopper, the combination, with two frames, each consisting of two ends and two sides rigidly secured together, and a chopping-wheel mounted in each frame, of connecting-bars adjustably connecting said frames at the front and rear, whereby they can be moved toward and away from each other and secured at any desired distance apart, substantially as set forth.

2. In a stalk-chopper, the combination, with two frames, each composed of two sides and two end sections rigidly secured together, and a chopping-wheel mounted in each frame, of front and rear connecting-bars to which the frames are adjustably secured, and a tongue secured to said bars, substantially as set forth.

3. In a stalk-chopper, the combination, with two frames, each carrying a chopper-wheel, of connecting-bars adjustably connecting the frames at their front and rear ends, covers secured to said connecting-bars, and a tongue secured to said bars, substantially as set forth.

4. In a cotton-chopper, the combination, with two frames adjustably connected together by means of front and rear connecting-bars, of a chopping-wheel in each frame, a tongue secured to the rear connecting-bar, and whiffletree-hooks secured to the outer front ends of the frames, substantially as set forth.

In testimony whereof I have signed this specification in the presence of two subscribing witnesses.

ROBT. H. TISDALE.

Witnesses:
R. M. PITTS,
H. M. SPANN.